United States Patent
Smith et al.

(10) Patent No.: US 10,783,197 B2
(45) Date of Patent: Sep. 22, 2020

(54) SYSTEMS AND METHODS FOR PROVIDING DIVERSE CONTENT

(71) Applicant: Facebook, Inc., Menlo Park, CA (US)

(72) Inventors: Jeffrey Matthew Smith, San Francisco, CA (US); Seetha Raj, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 467 days.

(21) Appl. No.: 15/476,874

(22) Filed: Mar. 31, 2017

(65) Prior Publication Data

US 2018/0285461 A1 Oct. 4, 2018

(51) Int. Cl.
| | | |
|---|---|---|
| G06F 16/9535 | (2019.01) | |
| G06F 16/954 | (2019.01) | |
| G06F 16/332 | (2019.01) | |
| G06F 16/33 | (2019.01) | |
| G06F 40/268 | (2020.01) | |
| H04L 29/08 | (2006.01) | |

(52) U.S. Cl.
CPC ...... *G06F 16/9535* (2019.01); *G06F 16/3325* (2019.01); *G06F 16/3344* (2019.01); *G06F 16/954* (2019.01); *G06F 40/268* (2020.01); *H04L 67/306* (2013.01); *H04L 67/02* (2013.01)

(58) Field of Classification Search
CPC ............. G06F 16/9535; G06F 16/3344; G06F 16/3325; G06F 16/954; G06F 17/2755; H04L 67/306; H04L 67/02
USPC ...................................................... 707/751
See application file for complete search history.

(56) References Cited

U.S. PATENT DOCUMENTS

| | | | | |
|---|---|---|---|---|
| 9,860,337 | B1* | 1/2018 | Brown | H04L 67/306 |
| 2015/0089409 | A1* | 3/2015 | Asseily | G06Q 10/10 |
| | | | | 715/765 |
| 2016/0232544 | A1* | 8/2016 | Scotson | G06Q 30/0204 |
| 2016/0275138 | A1* | 9/2016 | Rutenberg | G06F 16/9535 |
| 2017/0300185 | A1* | 10/2017 | Hasan | G06F 16/9535 |
| 2017/0301042 | A1* | 10/2017 | Ryan | G06Q 50/01 |
| 2019/0208370 | A1* | 7/2019 | Brunn | H04W 4/08 |

OTHER PUBLICATIONS

Zhang et al. "EagleEye: Entity-centric business intelligence for smarter decisions." IBM Journal of Research and Development Published Nov. 1, 2010. Accessed Jan. 31, 2020 from <https://ieeexplore.ieee.org/stamp/stamp.jsp?tp=&arnumber=5643250&tag=1> (Year: 2010).*

* cited by examiner

*Primary Examiner* — Robert W Beausoliel, Jr.
*Assistant Examiner* — Arthur Ganger
(74) *Attorney, Agent, or Firm* — Baker Botts L.L.P.

(57) ABSTRACT

In one embodiment, a method includes receiving an indication that a user is interested in a content (e.g., newsfeed). Based on metadata associated with the content, a topic of the content and an entity associated with the content may be determined (e.g., a political candidate's position on gun control). One or more first entities (e.g., other political candidates) may be selected based on the entity associated with the content. The selected first entities may be different from the entity associated with the content. First contents associated with the first entities and topically related to the topic of the content may be selected (e.g., other candidates' positions on gun control). At least a portion of the first contents may be displayed with at least a portion of the content. The content and at least one of the first contents may have different sentiments toward the topic.

20 Claims, 9 Drawing Sheets

SYSTEMS AND METHODS FOR PROVIDING DIVERSE CONTENT

TECHNICAL FIELD

This disclosure generally relates to information retrieval systems and methods, and more particularly to systems and methods for providing diverse viewpoints or opinions.

BACKGROUND

Social-networking systems provide a network through which opinions and views may be shared. Content provided through social-networking systems may be targeted or personalized for individuals. This may be due to the tendency of user to subscribe or follow self-selected content sources (e.g., other users, publishers, etc.) or being shown newsfeeds or posts that are shared by friends, who may have similar backgrounds and share similar views as the user. As a result, users may often be provided with content that reinforces their existing views, thus creating a form of echo chamber of information.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a Global Positioning System (GPS) receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

The embodiments disclosed herein automatically provide users with a diverse spectrum of opinions relating to a particular topic of interest. In particular embodiments, diverse information may be provided for particular types of topics where diverse views may be desirable. For example, during a presidential election, if a user expresses interest in a newsfeed or article relating to a presidential candidate's position on gun control (or any other political issue), the user may be automatically presented with a listing of each candidate's position on gun control. The user is thus presented with a spectrum of opinions surrounding the topic of gun control from different angles. As a result, the user would be better informed with respect to the topic and would be in a better position to draw his/her own conclusions.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, the systems and methods described herein automatically provide users with diverse information with respect to a topic of interest. The types of topic for which diverse information may be desired include, but are not limited to, political issues, candidates for a positions, bills or propositions, product or service reviews, fashion, food, or any other topic.

Figure 1A:
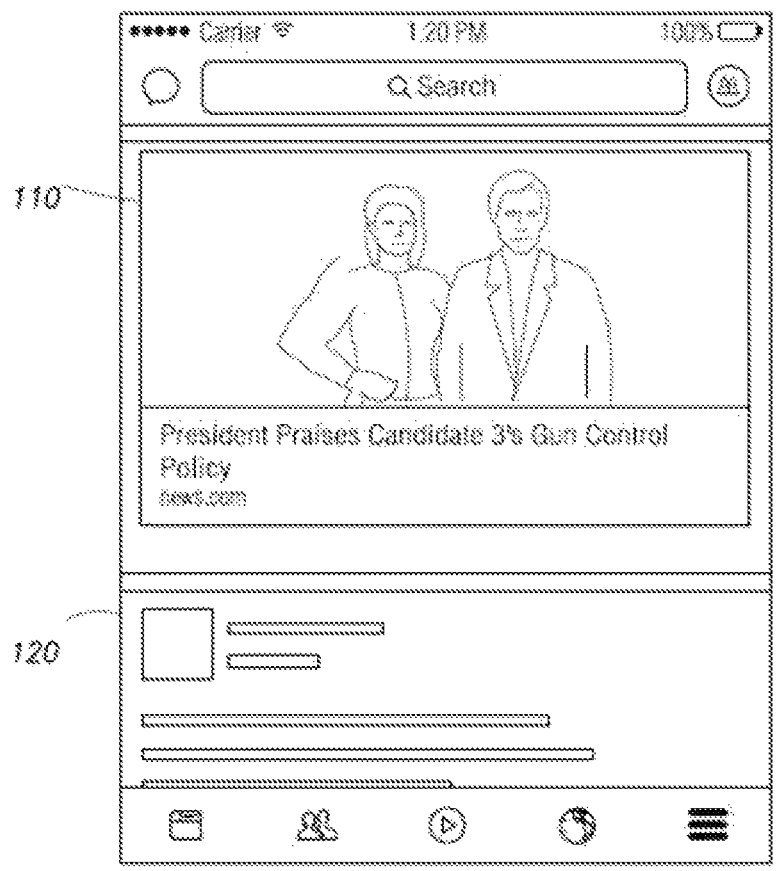
FIGS. 1A-1E illustrate an example of a particular embodiment of the present disclosure for providing diverse information in the context of a social-networking system.

FIGS. 1A-1E illustrate an example of a particular embodiment of the present disclosure for providing diverse information in the context of a social-networking system. FIG. 1A illustrates an example of a newsfeed presented to a user through a social-networking application. The newsfeed may include a first newsfeed item 110 and a second newsfeed item 120. The first newsfeed item may originate from a particular source (e.g., news.com, as shown in the example) and may be displayed with an image, title, caption, and/or extracted snippet. In the example shown, the newsfeed item 110 relates to a presidential candidate's position on the political issue of gun control. However, it should be appreciated that any other content may be presented.

Figure 1B:
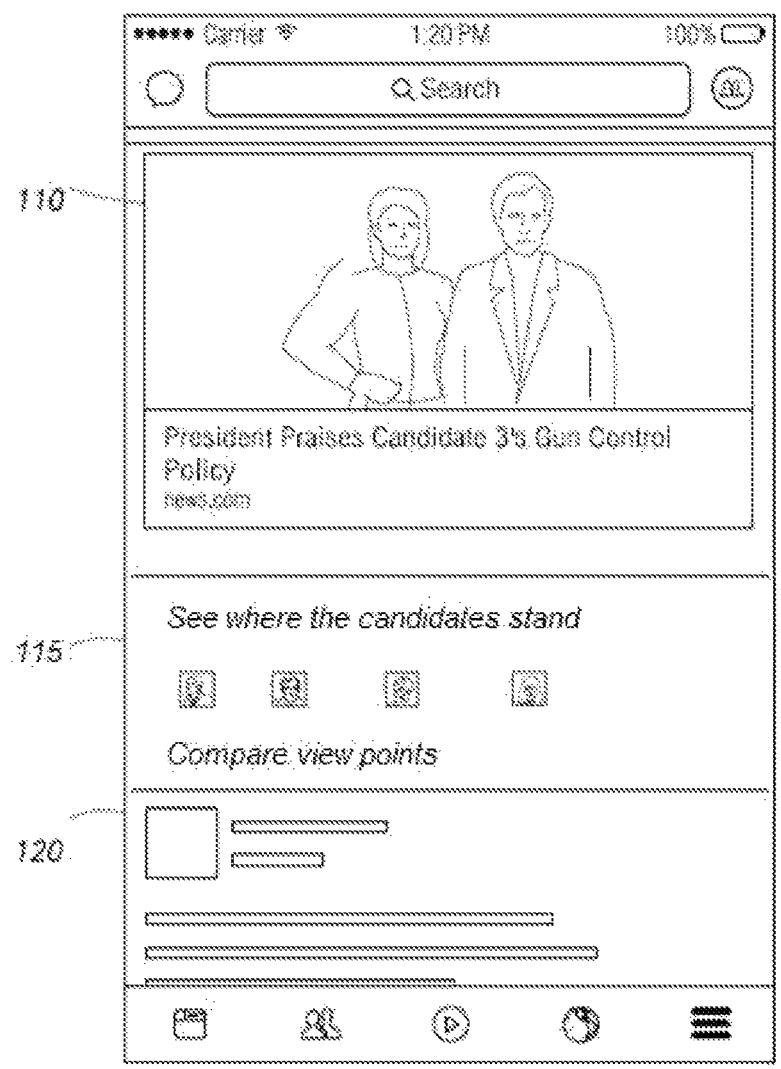

FIG. 1B illustrates an example of a actionable section 115 that may be shown to the user to indicate that diverse content relating to the newsfeed item 110 may be available. In particular embodiments, the actionable section 115 may show a message indicating that diverse content is available (e.g., "See where the candidates stand."). In particular embodiments, the actionable section 115 may additionally show identifiers (e.g., profile pictures, thumbnails, names, etc.) of any entity whose opinion may be available in the diverse content section. For example, if the diverse content section would feature opinions of candidates in an election, pictures of the candidates may be shown in the actionable section 115. In particular embodiments, the order in which these entities are shown may be random to avoid any perception of system bias. In particular embodiments, the actionable section 115 may be configured to, upon activation (e.g., being clicked or tapped on), display a corresponding diverse content section, such as the diverse content section 130 shown in FIG. 1C. In particular embodiments, the actionable section 115 may not be part of the user interface or triggering flow for displaying diverse content. For example, instead of requiring a user to explicitly instruct the application to display diverse content through the actionable section 115, the diverse content section 130 shown in FIG. 1C may be automatically displayed upon satisfaction of certain triggering condition, as detailed below.

Figure 1C:
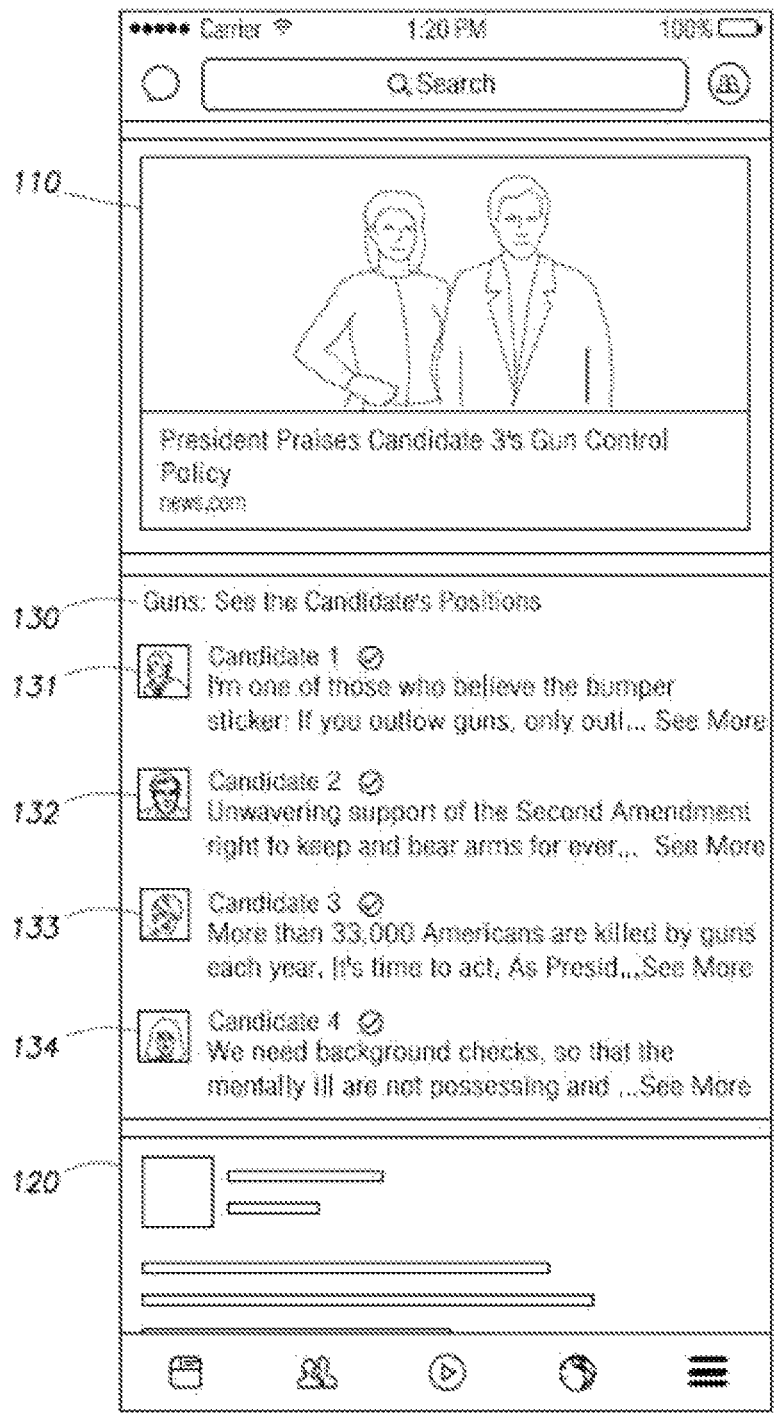

Depending on the embodiments, the actionable section 115 in FIG. 1B or the diverse content section 130 in FIG. 1C may be presented to a user upon detection of certain triggering events. For example, the actionable section 115 or diverse content section 130, if available, may be presented upon detection of user interest in the newsfeed item 110. For instance, the user may indicate an affinity for the article (e.g., indicating that he/she likes the article), provide a comment, share the article with another user, click on the article and return to the newsfeed, maintain the current position of the newsfeed items such that the newsfeed item 110 is in view, and any other types of indicia of interest. The triggering event may be detected by the application running on the client device (e.g., social-networking application) or detected by a server associated with the client-side application (e.g., the client may forward user input information to the server).

In particular embodiments, the diverse content section 130 may be displayed below the newsfeed item 110, below the newsfeed item 110 and above the next newsfeed item 120, in a separate display panel rather than being inline in the newsfeed (e.g., a separate comparison page or panel may replace the current view or be simultaneously displayed with the current view), or in any other suitable display format. In particular embodiments, the diverse content section 130 may include one or more opinions or views of other entities on a topic related to that of the newsfeed item 110. For example, if the social-networking system determines that the newsfeed item 110 pertains to presidential candidate 3's view or opinion on the issue of gun control, the diverse content section 130 may include each of the presidential candidates' views or opinions on gun control 131, 132, 133, 134. In particular embodiments, each entry listed in the diverse content section 130 may represent an entity's view, and may include a thumbnail image representing the entity, an identifier for the entity (e.g., name), and a snippet of the entity's position or opinion.

Figure 1D:
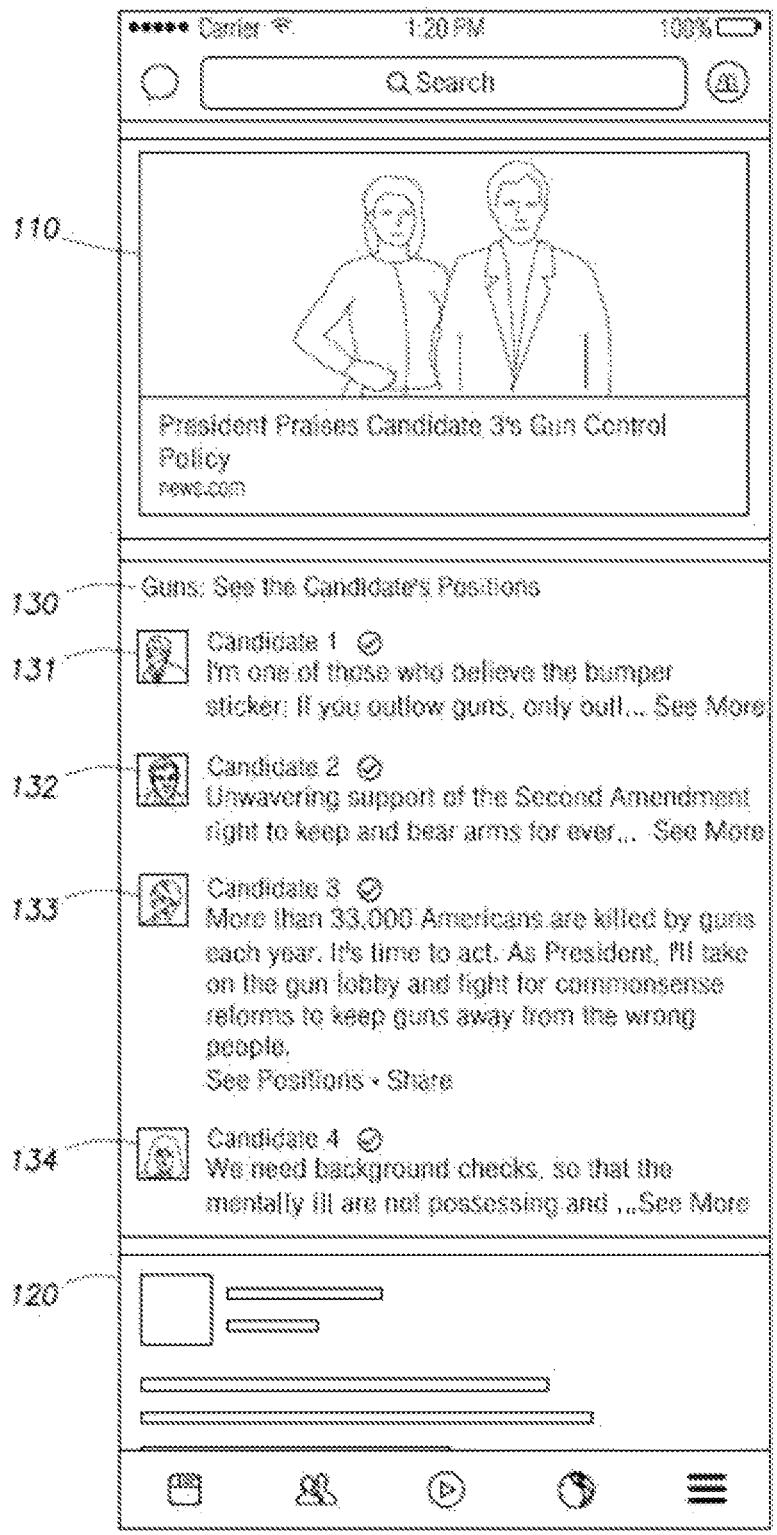

In particular embodiments, the snippet may be limited to a predetermined length (e.g., based on characters, words, lines, etc.), and a hyperlink or equivalent user interface may be provided to allow the user to see more of the text (e.g., the "See More" link as shown in FIG. 1C). FIG. 1D illustrates an expanded snippet for candidate 3. In particular embodiments, the expanded snippet may be limited to a length that is greater than the length of the originally-displayed snippet (e.g., as shown in FIG. 1C). In particular embodiments, the expanded snippet may be limited to one or more complete sentences or paragraphs. In particular embodiments, the snippets may be obtained from a source that limits length, and if so the entirety of the source may be displayed without further rule-based limitations. For example, an article or a candidate's opinion page may have a section designated for a summary or abstract, which may be limited by length; the summary or abstract may be used as the content source for the snippets. In particular embodiments, a link to the full article or opinion may also be provided. For example, a user may click on an entity's name and/or any other location associated with the entity's entry and be directed to a corresponding full article or page.

Figure 1E:
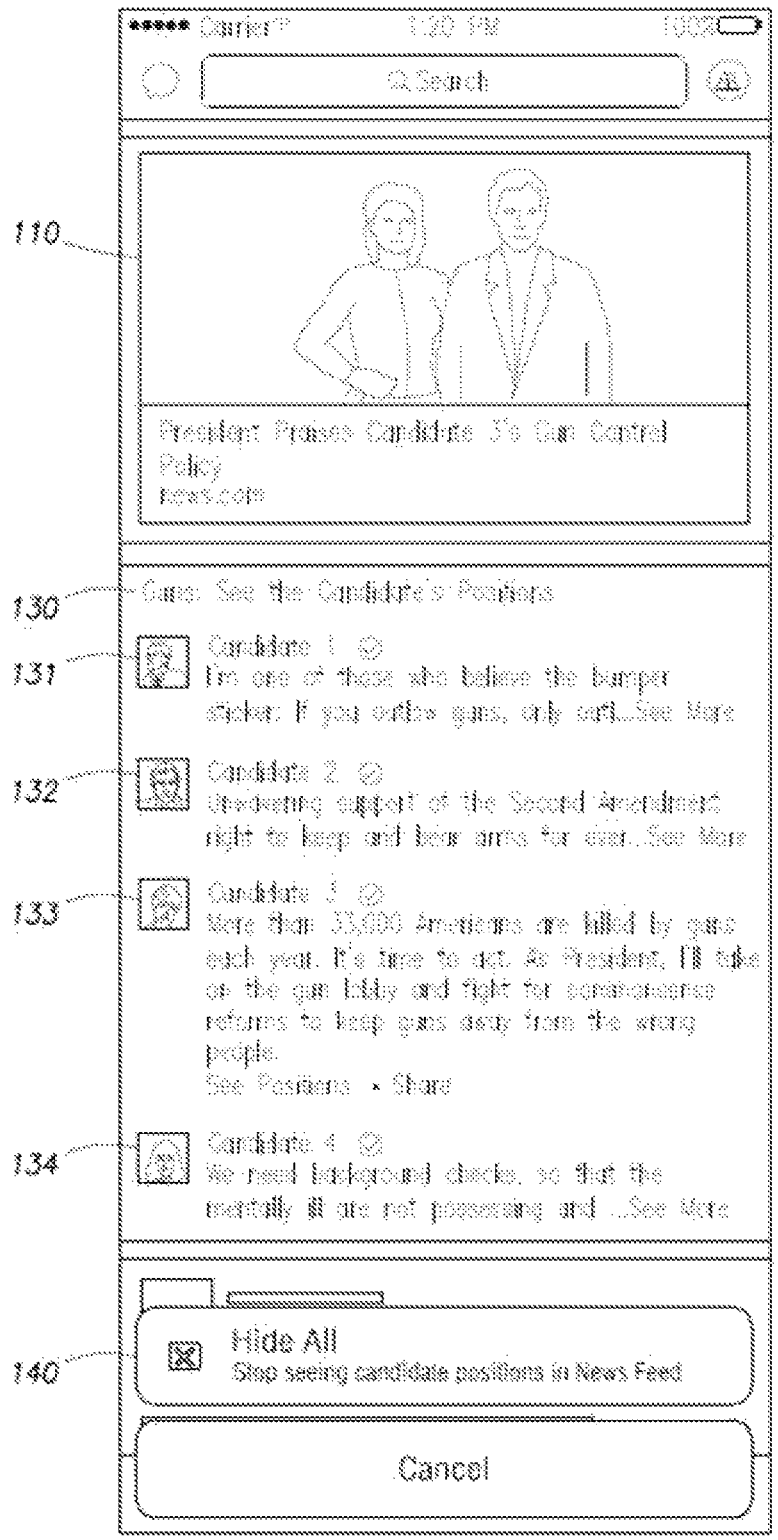

In particular embodiments, the user may selectively enable or disable the feature for displaying the diverse content section. For example, FIG. 1E shows an embodiment where the user may be presented with an option 140 to stop seeing diverse content in the future. Such a selection may apply to the feature in general, meaning that the user would no longer be presented with any diverse content (e.g., the diverse content section 130 may no longer be displayed for any content). In particular embodiments, the option for disabling the feature may only apply to the particular topic and/or entity to which the newsfeed item 110 relates. For example, if the newsfeed item 110 relates to the topic of gun control, the user may choose to disable any diverse content relating to gun control. However, if the user later shows interest in another topic (e.g., immigration), the diverse content section 130 may still be displayed. As another example, the diverse content section may be disabled based on entity. For instance, if the newsfeed item 110 relates to an opinion or position taken by a candidate for a political office, the user may be presented with an option to disable the diverse content section from being displayed for opinions by candidates for that political office. In the example shown in FIG. 1E, the option 140 allows the diverse content section to be selectively disabled for candidates.

In particular embodiments, whether the diverse content section is presented may depend on the satisfaction of certain predetermined rules. In particular embodiments, to not cause information fatigue, certain display limits may be in place. For example, limits may be based on topics/issues (e.g., the diverse content section may be displayed at most once per day for a particular topic or issue). As another example, limits may be particular to specific entities or candidates (e.g., diverse content may be displayed twice per day for each candidate for the same issue). As yet another example, the total number of diverse content sections displayed in a predetermined period of time may be limited (e.g., five per day).

In particular embodiments, features of the diverse content section may be designed to minimize or eliminate any perceived bias on the part of the system generating the diverse content section (e.g., the social-networking network system or the service provider in general). In particular embodiments, a set of entities may be defined such that opinions from all entities may be needed in order for diverse content to be considered complete. In particular embodiments, the diverse content section may be surfaced only if the system determines that complete diverse content could be provided. This criterion avoids presenting incomplete views or opinions (i.e., views from only certain entities but not others). For example, in a presidential election, the candidates running for the presidential office may be known. In the example shown in FIGS. 1A-1E, four candidates are shown. Prior to displaying a diverse content section relating to, e.g., gun control, the system may check whether every predetermined candidate's opinion on the given topic is available for display. For instance, the system may check whether every candidate completed the portion of his/her profile information pertaining to gun control, and/or whether the information can be found and retrieved from a third-party system external to the social-networking system). In particular embodiments, if this criterion is not satisfied, the diverse content section may not be displayed; on the other hand, if the criterion is satisfied, then the diverse content section may be displayed. In particular embodiments, the diverse content section may be displayed even though not every entity's view or opinion is available. For example, the diverse content section may display the available views or opinions of entities and use placeholders for entities whose views or opinions are unavailable. For instance, the candidate's name may be listed, but the snippet or text relating to his/her view or opinion may be left blank or be populated with a message indicating that the candidate has not yet stated a view or opinion.

In particular embodiments, perceived bias may also be minimized by displaying the opinions of the entities in random order. For example, FIGS. 1A-1E show the candidates being displayed in the following order: Candidate 1, Candidate 2, Candidate 3, and Candidate 4. In particular embodiments, the order in which these candidates are displayed may be determined using a random or pseudo-random generator. For instance, when the same (or any other) diverse content section 130 relating to presidential candidates' views or opinions on gun control is displayed at a different time, it may be equally possible for the candidate to be displayed in the following order (or any other order): Candidate 2, Candidate 3, Candidate 1, and Candidate 4. By doing so, the system may minimize or eliminate any perceived bias that a user may attribute to the order in which candidates are displayed (e.g., users may perceive candidates being listed closer to the top as being more important or favored).

The system generating diverse content sections (e.g., a social-networking system) may define certain triggering conditions for displaying diverse content. Certain triggering rules may apply to every diverse content section, and other triggering rules may be applicable to certain types of diverse content sections. In particular embodiments, the system may require a user to show interest in a newsfeed item or article. For example, the system may monitor the user's behavior (via feedback provided the user's device) and determine that the newsfeed item remains in the display region of the user's device for a period of time exceeding a particular threshold (e.g., 3, 5, or any number of seconds). This behavior pattern may suggest that the user is reading the newsfeed item or article. In particular embodiments where a front-facing camera is available on the user's device, the camera may be used to track the user's eye movement to detect whether the user is engaged in reading (e.g., which may be detected if the user's irises are repeatedly moving from left to right). In particular embodiments, user interest may also be evident from the user's interaction with certain features associated with the newsfeed item or article. For example, the user may specify an affinity (e.g., "liking" the newsfeed item), post a comment in a comment section of the newsfeed item, share the newsfeed item with friends, choose to see more of a snippet, click and view the full content, and any other interaction with the newsfeed item. In particular embodiments, the newsfeed item or article may need to be of sufficient quality in order for the diverse content section to be displayed. Such a determination may be based on, e.g., the number of social-networking users showing interest in the newsfeed item or article (e.g., by following, commenting, liking, or sharing the content). For example, a newsfeed item may be deemed to be of sufficient quality if it has more than a threshold number of followers (e.g., more than 500, 1000, or 5000 followers). In particular embodiments, the quality of a newsfeed item or article may also depend on the number of social-networking users following the content's author or publisher (e.g., the number of followers of the New York Times exceeding a certain threshold). In particular embodiments, certain diverse content sections may require the associated newsfeed or article to have an identifiable anchor topic, which may be used to determine the diverse contents to surface (the diverse contents may pivot around and provide different views/opinions on the anchor topic). For example, the diverse content section may be displayed for a newsfeed item if the system is able to automatically identify at least one topic to which the item relates. In particular embodiments, the system may use a machine-learning model or classifier to identify topics and may generate a confidence score associated with a topic identification. A topic may be considered to be identifiable if the associated confidence score is sufficiently high (e.g., greater than 50%, 60%, 90%, etc.). In particular embodiments, a triggering rule may require the identification of an anchor entity that expresses a view/opinion on the topic in the newsfeed item or article. The anchor entity may be a person, organization, publisher, etc., and may be used to determine other suitable entities whose views/opinions should be surfaced in the diverse content section. Any combination of triggering rules may be required for any given diverse content section. For example, a diverse content section designed to display the views/opinions of political candidates may require a newsfeed item or article to be (1) related a predetermined issue of interest (e.g., gun control, abortion, immigration, fiscal policy, etc.), and (2) associated with a predetermined candidate (e.g., candidates who are running for a particular office).

In particular embodiments, the system may automatically identify the anchor topic of a newsfeed item or article. In particular embodiments, the system may utilize machine-learning, clustering, and/or classification algorithms to build a computer model for identifying topics. For example, a supervised classification model may be trained using a corpus or a data set of articles with known topic labels. During training, features of the newsfeed items or articles may be identified and weighted appropriately based on their predictiveness of the contents' topics. In particular embodiments, a predetermined taxonomy relating to a particular topic may be identified using clustering analysis. For example, the clustering algorithm may determine that content relating to gun control often include the following terms: e.g., gun control, Second Amendment, right to bear arms, gun violence, back-ground check, among others. In particular embodiments, the computer model for topic identification may take as input the text of the newsfeed items or articles. In particular embodiments, in addition or alternatively, the computer model may take as input metadata associated with the newsfeed items or articles to determine their topics. For example, users in a social-networking system may tag (e.g., hashtags) and/or comment on a newsfeed item. Such information (e.g., tags and comments) may be used by the computer model to predict the newsfeed item's topic. In particular embodiments, a computer model may be trained to analyze a newsfeed item's text and/or metadata to predict its topic. In particular embodiments, the identified anchor topic may then be used as a pivot point around which other contents providing different view on that topic may be identified.

In particular embodiments, the diverse content section may be configured to identify political topics in general as an anchor during political election season. For example, based on content transmitted through the system (e.g., user comments, posts, etc.) and/or system administrator input, the system may recognize that certain election season may be taking place in certain geographic regions (e.g., presidential election in the U.S.). During such times when political interests may be heightened, the system in particular embodiments may detect that a newsfeed item or article is related to politics in general, and in response may surface a diverse content section relating to the opinions or viewpoints of the candidates in the upcoming election (or an option to the diverse content section, such as the actionable section 115 shown in FIG. 1B). In particular embodiments, the triggering condition for displaying the diversity content section (or the option to view it) may be a determination that a newsfeed item or article relates to politics generally and furthermore features the name of at least one of the candidates in the upcoming election. In particular embodiments, the system may also take into consideration the location of the viewing user (e.g., based on location data obtained from the user's device or user profile information) to see if the user is in the geographic location where the election is taking place (e.g., whether the user is located in the U.S.). In particular embodiments, the diverse content section relating to the election may only be shown to users within the relevant geographic region.

In particular embodiments, the entity whose opinion or view is provided in the newsfeed item or article may be automatically identified. In particular embodiments, the anchor entity may be a person whose views are being discussed in the newsfeed item or article (e.g., in FIGS. 1A-1E where the newsfeed item 110 relates to the president praising Candidate 3's gun control policy, Candidate 3 may be defined as the anchor entity). In particular embodiments, the anchor entity may be the author, publisher, website, news agency, or other source of the newsfeed item (e.g., the newsfeed item 110 in FIGS. 1A-1E are from news.com, which may be the anchor entity in certain embodiments). Similar to topic identification, entities may be identified using computer models trained using machine-learning, clustering, and/or classification algorithms. For example, the computer model may be trained to identify features that indicate whose opinion is being expressed. Again, the computer model may analyze the text and/or metadata associated with the newsfeed items/articles. For example, social-networking users may tag or comment on a political article, and such metadata may indicate that the article relates to Candidate 3's position on gun control (using the example shown in FIGS. 1A-1E). The training process of the computer model may involve using a corpus of newsfeed items or articles with known labels (e.g., in this case, the labels may be entities). In particular embodiments, a computer model may be trained specifically for identifying entities within a particular context or subject matter. For example, a computer model may be specifically trained to identify the political candidates and/or topics or issues that are relevant in an election. In this case, the target entities (e.g., names of the candidates running for office) and target topics/issues may be known, and the computer model may be trained to classify newsfeed items or articles into one or more of the target entities or target topics/issues (e.g., using features in the text or metadata to predict the classifications). In particular embodiments, candidate target entities may be selected if they satisfy certain criteria, such as having a certain threshold number of social-networking followers or being authentic and notable (e.g., can be automatically found Wikipedia or recognized by an independent 3rd-party source). In particular embodiments, the identified anchor entity may be used as a pivot point around which other entities whose opinions/views would be surfaced may be identified.

In particular embodiments, information presented in a diverse content section may be selected based on the identified anchor entity. In particular embodiments, other entities to be surfaced in the diverse content section may be selected based on characteristics of the anchor entity. For example, the entities selected to be surfaced may be the same type of entity as the anchor entity. For instance, if the anchor entity of a newsfeed item is a candidate for political office, the selected entities may be the other candidates running for that office. As another example, if the anchor entity is a news website (e.g., news.com), the selected entities may be other news websites. The particular rules for determining which other entities are selected may be customized for each type of diverse content campaign.

In particular embodiments, content selected for display in a diverse content section may be selected based on the identified anchor topic. In particular embodiments, a clustering algorithm may be used to identify contents that are topically related to the anchor topic. In particular embodiments, a distance algorithm may be used to select contents from those contents, which are topically-related, that are sufficiently different. The content difference may be measured along any spectrum. Conceptually, a spectrum of diversity may be relative to entities (e.g., opinions of different political candidates on a topic; fashion sense in different countries). A spectrum of diversity may also be relative to topics (e.g., diverse opinions on a political issue, such as gun control; diverse opinions with respect to a particular fashion, such as grunge). In particular embodiments, predetermined spectrums with general applicability to different types of diverse content sections may be defined. For instance, a distance algorithm may include features for identifying diverging views (e.g., negative, positive, or neutral sentiment towards the topic). As another example, location and/or time period may also be relevant features used in a distance algorithm (e.g., it may be desirable to provide diverse opinions from different geographic locations, demographics, age group, era, etc.). In particular embodiments, contents that are topically related may be further classified using a clustering or classifier algorithm. For example, topically-related contents may be clustered to identify clusters of similar content. For instance, based on words used in the contents, the clustering algorithm may identify clusters of contents that share similar sentiment. In particular embodiments, the contents displayed in a diverse content section may be selected from different ones of these clusters to provide contents belonging to different segments of a diversity spectrum.

In particular embodiments, contents selected for display may be based on both an anchor entity and an anchor topic. In these cases, the pool of possible contents from which to select may be narrowed by the entities selected for surfacing. For example, the entities to surface may be selected first, followed by a selection of relevant content associated with those entities. For instance, in a political election scenario, the candidates for an office may first be determined, and their views on a particular topic may then be selected. For example, the candidates may be determined based on information in a database that identifies every candidate running for a particular office (e.g., each candidate running for office may have a personal profile page stored on a social-networking system or on an external website). Once the entities to surface have been selected, the system may then select particular content provided by each candidate that is relevant to the anchor topic. For example, each candidate's profile page may include his/her opinions or views on the major issues. If the anchor topic is gun control, then contents selected for display may be retrieved from the portion of each candidate's profile relating to the issue of gun control. Alternatively, articles relating to a candidate's opinion on the topic may be automatically pulled from a third-party system (e.g., the entity's own website).

Figure 2:
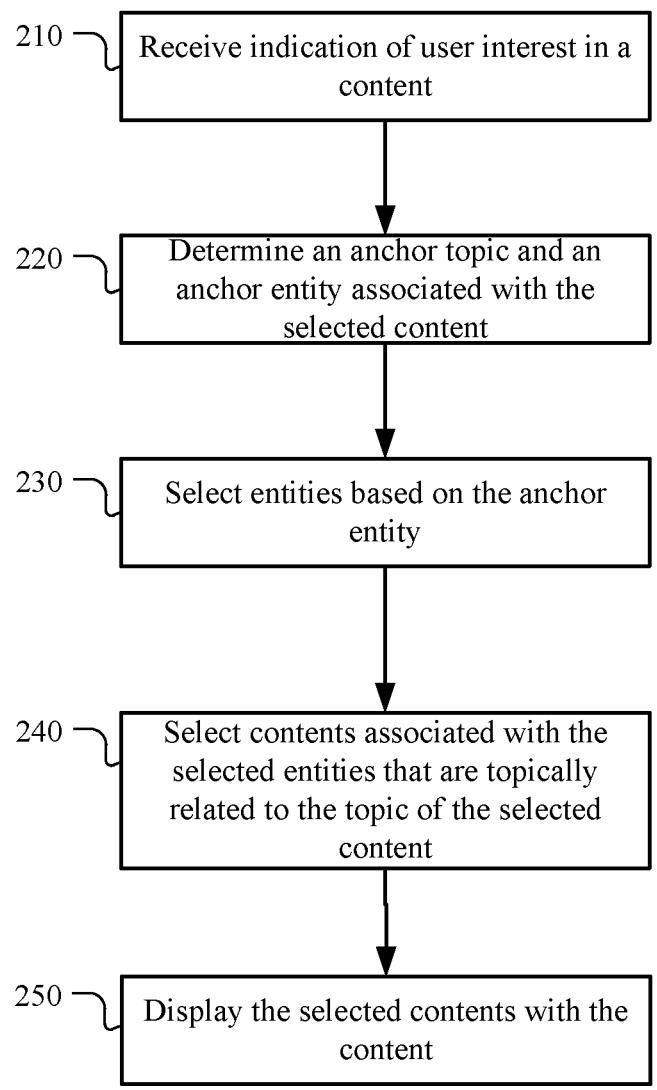
FIG. 2 illustrates an example method for generating a diverse content section.

FIG. 2 illustrates an example method 200 for generating a diverse content section. The method may begin at step 210, where an indication that a user is interested in a content may be received by a system (e.g., a social-networking system). The indication may be, for example, a user clicking on a newsfeed item or article, indicating an affinity towards it, etc. At step 220, a topic of the content and an entity associated with the content may be determined. In particular embodiments, the determination may be based on metadata associated with the content, such as tags and/or comments provided by social-networking users, content creation date (e.g., publication date, file-upload date, etc.), content location (e.g., the geographic region from which the content originated). In particular embodiments, the determination may also be based on text of the content. The determined topic and entity may be used as anchors around which diverse content may be selected. At step 230, one or more entities may be selected based on the entity associated with the content. The selected entities may be different from the entity associated with the content (e.g., other candidates running for a particular government office). At step 240, contents associated with the selected entities may be selected. The selected contents may be topically related to the topic of the content. At step 250, at least a portion of the selected contents may be displayed with at least a portion of the content. In particular embodiments, the content and at least one of the selected contents may have different sentiments toward the topic.

In particular embodiments, the determining of the topic may be based on a classifier model trained to predict which of a plurality of predetermined topics relates to a content provided as input to the classifier model. For example, a classifier model may be trained to predict whether a given content relates to the issue of gun control, abortion, foreign policy, etc. In particular embodiments, the plurality of predetermined topics may be determined using clustering analysis. For example, clustering analysis may be used to categorize a collection of content, with each cluster of content being related to a particular topic. In particular embodiments, metadata associated with the content may be tags selected by users of a social-networking system (e.g., hashtags indicating that the content relates to Candidate 3's political opinion and/or the issue of gun control). In particular embodiments, the entity associated with the content may be a candidate for a political office and the topic of the content may be a political issue category (e.g., gun control, foreign policy, etc.), and the content may be related to an opinion of the candidate on the political issue category. In particular embodiments, the selected entities may be candidates for the political office, and one of the selected contents relates to an opinion of one of the candidates on the political issue category. In particular embodiments, the system may determine that all candidates for the political office in an election consist of the candidate (the entity associated with the content) and the other selected candidates. In particular embodiments, the system may determine that opinions of all the candidates on the political issue category are accessible. In particular embodiments, one of the selected contents associated with one of the selected entities may be retrieved from a profile page of a social-networking system, the profile page being is associated with that entity. In particular embodiments, one of the selected contents associated with one of the selected entities is retrieved from a third-party web page relative to the social-networking system, the third-party web page being associated with that entity. In particular embodiments, the displayed portions of the selected contents are displayed in an order that is randomly determined. In particular embodiments, the entity associated with the content is a person, a publisher, or an organization. In particular embodiments, each of the selected entities is of the same type as that of the entity associated with the content. In particular embodiments, selection of the contents is based on clustering analysis. In particular embodiments, selecting the contents comprises using a distance measure to determine that the first contents cover a spectrum of opinions on the topic. In particular embodiments, the system may determine that the content has at least a threshold number of followers on a social-networking system expressing an interest in the content. In particular embodiments, the system may determine that the topic of the content is one of a plurality of predetermined topics, and that the entity associated with the content is one of a plurality of predetermined entities. In particular embodiments, the system may determine that a maximum limit within a predetermined time period for displaying the portion of the first contents has not been reached.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for generating a diverse content section including the particular steps of the method of FIG. 2, this disclosure contemplates any suitable method for generating a diverse content section including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
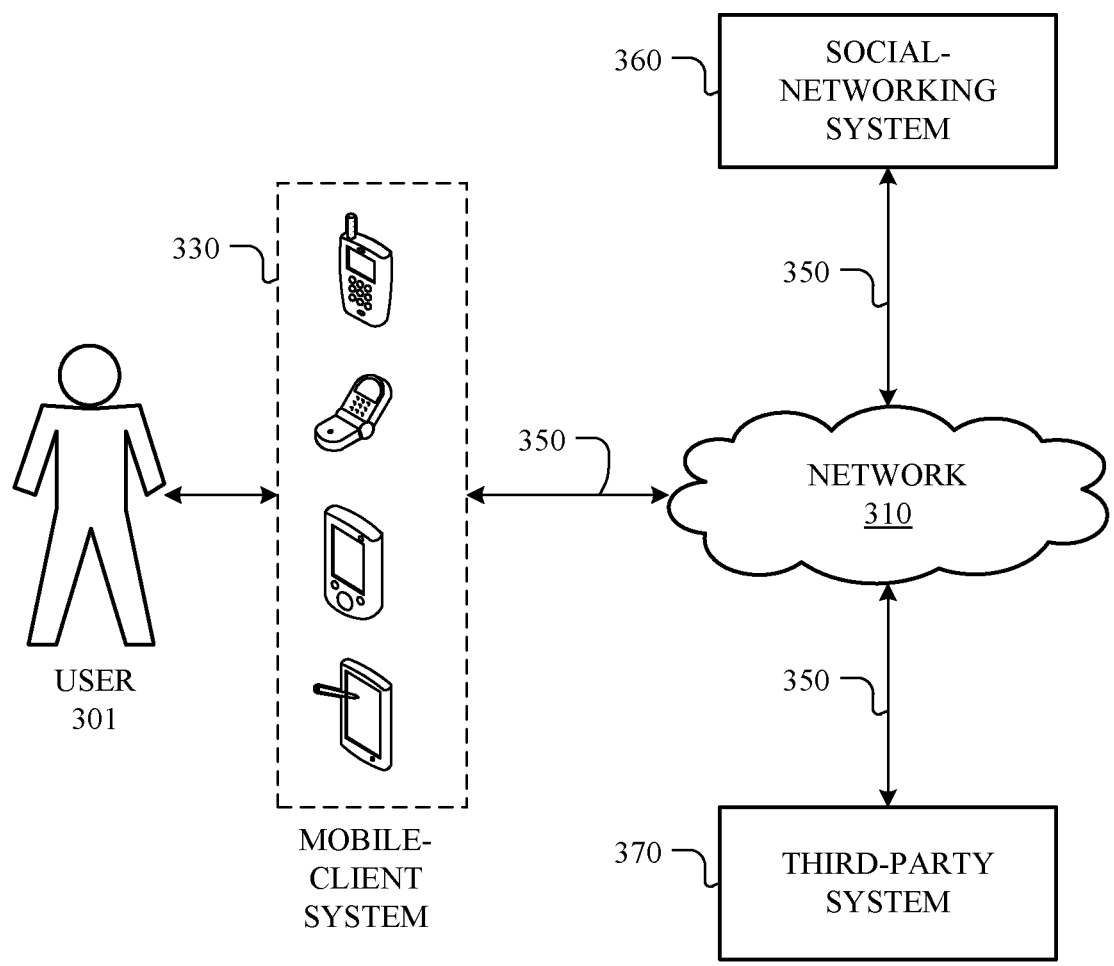
FIG. 3 illustrates an example network environment associated with a social-networking system.

FIG. 3 illustrates an example network environment 300 associated with a social-networking system. Network environment 300 includes a user 301, a client system 330, a social-networking system 360, and a third-party system 370 connected to each other by a network 310. Although FIG. 3 illustrates a particular arrangement of user 301, client system 330, social-networking system 360, third-party system 370, and network 310, this disclosure contemplates any suitable arrangement of user 301, client system 330, social-networking system 360, third-party system 370, and network 310. As an example and not by way of limitation, two or more of client system 330, social-networking system 360, and third-party system 370 may be connected to each other directly, bypassing network 310. As another example, two or more of client system 330, social-networking system 360, and third-party system 370 may be physically or logically co-located with each other in whole or in part. Moreover, although FIG. 3 illustrates a particular number of users 301, client systems 330, social-networking systems 360, third-party systems 370, and networks 310, this disclosure contemplates any suitable number of users 301, client systems 330, social-networking systems 360, third-party systems 370, and networks 310. As an example and not by way of limitation, network environment 300 may include multiple users 301, client system 330, social-networking systems 360, third-party systems 370, and networks 310.

In particular embodiments, user 301 may be an individual (human user), an entity (e.g., an enterprise, business, or third-party application), or a group (e.g., of individuals or entities) that interacts or communicates with or over social-networking system 360. In particular embodiments, social-networking system 360 may be a network-addressable computing system hosting an online social network. Social-networking system 360 may generate, store, receive, and send social-networking data, such as, for example, user-profile data, concept-profile data, social-graph information, or other suitable data related to the online social network. Social-networking system 360 may be accessed by the other components of network environment 300 either directly or via network 310. In particular embodiments, social-networking system 360 may include an authorization server (or other suitable component(s)) that allows users 301 to opt in to or opt out of having their actions logged by social-networking system 360 or shared with other systems (e.g., third-party systems 370), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 370 may be a network-addressable computing system that can host content that may be used for a diverse content section. Third-party system 370 may generate, store, receive, and send third-party system data, such as, for example, a political candidate's opinions on various issues, a news or review website's articles on various topics, etc. Third-party system 370 may be accessed by the other components of network environment 300 either directly or via network 310. In particular embodiments, one or more users 301 may use one or more client systems 330 to access, send data to, and receive data from social-networking system 360 or third-party system 370. Client system 330 may access social-networking system 360 or third-party system 370 directly, via network 310, or via a third-party system. As an example and not by way of limitation, client system 330 may access third-party system 370 via social-networking system 360.

Client system 330 may be any suitable computing device, such as, for example, a personal computer, a laptop computer, a cellular telephone, a smartphone, a tablet computer, or an augmented/virtual reality device.

This disclosure contemplates any suitable network 310. As an example and not by way of limitation, one or more portions of network 310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 310 may include one or more networks 310.

Links 350 may connect client system 330, social-networking system 360, and third-party system 370 to communication network 310 or to each other. This disclosure contemplates any suitable links 350. In particular embodiments, one or more links 350 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 350, or a combination of two or more such links 350. Links 350 need not necessarily be the same throughout network environment 300. One or more first links 350 may differ in one or more respects from one or more second links 350.

Figure 4:
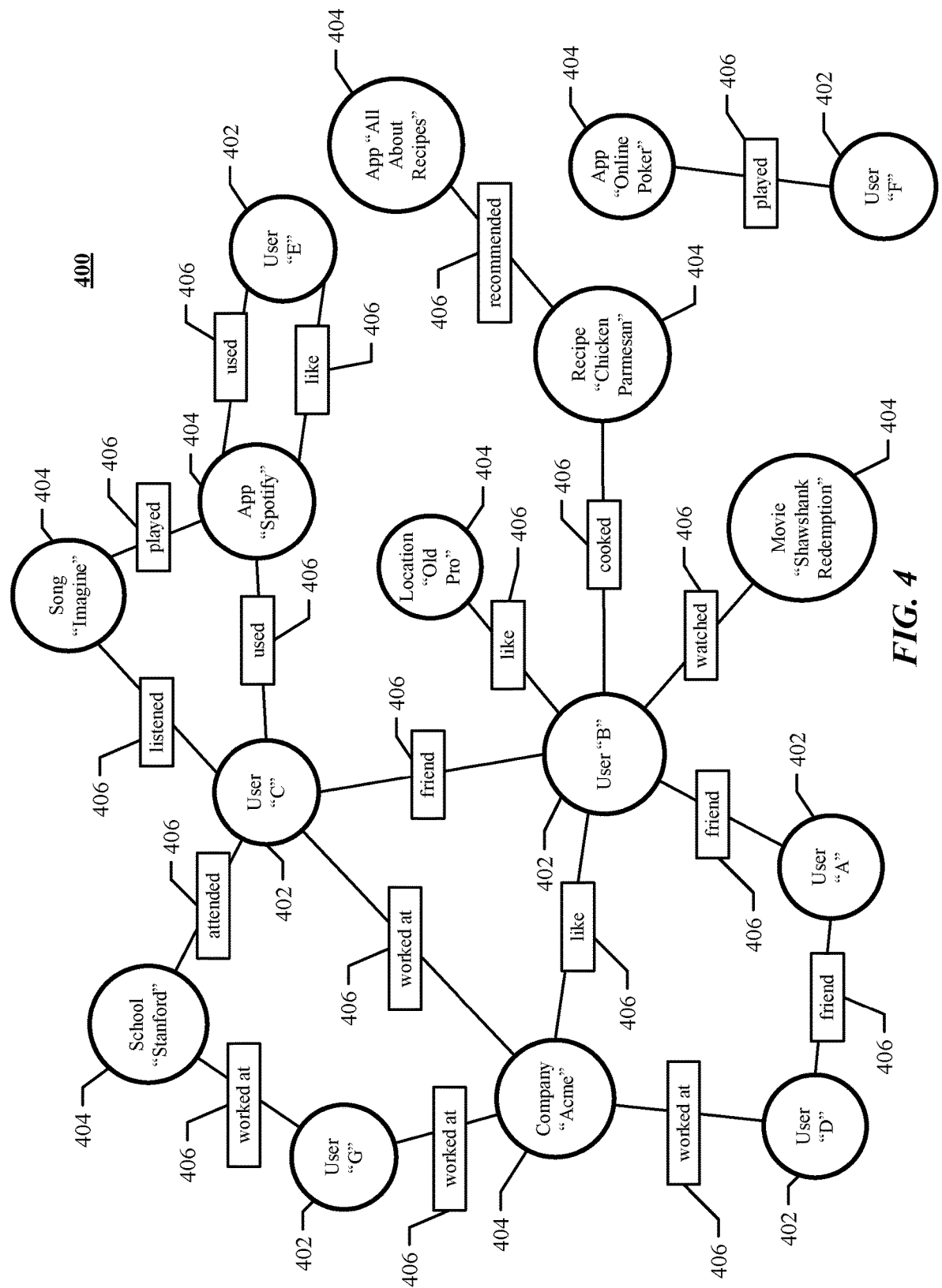
FIG. 4 illustrates an example social graph.

FIG. 4 illustrates example social graph 400. In particular embodiments, social-networking system 360 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 360, client system 330, or third-party system 370 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 360. As an example and not by way of limitation, a user may be an individual (human user), an entity (e.g., an enterprise, business, or third-party application), or a group (e.g., of individuals or entities) that interacts or communicates with or over social-networking system 360. In particular embodiments, when a user registers for an account with social-networking system 360, social-networking system 360 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 360. In particular embodiments, a user node 402 may be associated with information provided by a user or information gathered by various systems, including social-networking system 360. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages.

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 360 or a third-party website associated with a web-application server); an entity (such as, for example, a person, business, group, sports team, or celebrity); a resource (such as, for example, an audio file, video file, digital photo, text file, structured document, or application) which may be located within social-networking system 360 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 404 may be associated with information of a concept provided by a user or information gathered by various systems, including social-networking system 360. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more webpages.

In particular embodiments, a node in social graph 400 may represent or be represented by a webpage (which may be referred to as a "profile page"). Profile pages may be hosted by or accessible to social-networking system 360. Profile pages may also be hosted on third-party websites associated with a third-party system 370. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 370. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 330 to send to social-networking system 360 a message indicating the user's action. In response to the message, social-networking system 360 may create an edge (e.g., a check-in-type edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 360 may send a "friend request" to the second user. If the second user confirms the "friend request," social-networking system 360 may create an edge 406 connecting the first user's user node 402 to the second user's user node 402 in social graph 400 and store edge 406 as social-graph information in one or more of data stores 364. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to an edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 360 may create a "favorite"

edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 360 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 360 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 360 may create an edge 406 between a user node 402 and a concept node 404 in social graph 400. As an example and not by way of limitation, a user viewing a concept-profile page (such as, for example, by using a web browser or a special-purpose application hosted by the user's client system 330) may indicate that he or she likes the concept represented by the concept node 404 by clicking or selecting a "Like" icon, which may cause the user's client system 330 to send to social-networking system 360 a message indicating the user's liking of the concept associated with the concept-profile page. In response to the message, social-networking system 360 may create an edge 406 between user node 402 associated with the user and concept node 404, as illustrated by "like" edge 406 between the user and concept node 404. In particular embodiments, social-networking system 360 may store an edge 406 in one or more data stores. In particular embodiments, an edge 406 may be automatically formed by social-networking system 360 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

In particular embodiments, social-networking system 360 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 370 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 360 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 360 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 360 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 360 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 360 may calculate a coefficient based on a user's actions. Social-networking system 360 may monitor such actions on the online social network, on a third-party system 370, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 360 may calculate a coefficient based on the user's actions with particular types of content. The content may be associated with the online social network, a third-party system 370, or another suitable system. The content may include users, profile pages, posts, news stories, headlines, instant messages, chat room conversations, emails, advertisements, pictures, video, music, other suitable objects, or any combination thereof. Social-networking system 360 may analyze a user's actions to determine whether one or more of the actions indicate an affinity for subject matter, content, other users, and so forth. As an example and not by way of limitation, if a user frequently posts content related to "coffee" or variants thereof, social-networking system 360 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 360 may calculate a coefficient based on the type of relationship between particular objects. Referencing the social graph 400, social-networking system 360 may analyze the number and/or type of edges 406 connecting particular user nodes 402 and concept nodes 404 when calculating a coefficient. As an example and not by way of limitation, user nodes 402 that are connected by a spouse-type edge (representing that the two users are married) may be assigned a higher coefficient than a user nodes 402 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 360 may determine that the user has a higher coefficient with respect to the first photo than the second photo because having a tagged-in-type relationship with content may be assigned a higher weight and/or rating than having a like-type relationship with content. In particular embodiments, social-networking system 360 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 360 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 400. As an example and not by way of limitation, social-graph entities that are closer in the social graph 400 (i.e., fewer degrees of separation) may have a higher coefficient than entities that are further apart in the social graph 400.

In particular embodiments, social-networking system 360 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 330 of the user). A first user may be more interested in other users or concepts that are closer to the first user. As an example and not by way of limitation, if a user is one mile from an airport and two miles from a gas station, social-networking system 360 may determine that the user has a higher coefficient for the airport than the gas station based on the proximity of the airport to the user.

In particular embodiments, social-networking system 360 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 360 may provide information that is relevant to user's interests and current circumstances, increasing the likelihood that they will find such information of interest. In particular embodiments, social-networking system 360 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 360 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 360 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 370 (e.g., via an API or other communication channel), or from another suitable system. In response to the request, social-networking system 360 may calculate the coefficient (or access the coefficient information if it has previously been calculated and stored). In particular embodiments, social-networking system 360 may measure an affinity with respect to a particular process. Different processes (both internal and external to the online social network) may request a coefficient for a particular object or set of objects. Social-networking system 360 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Figure 5:
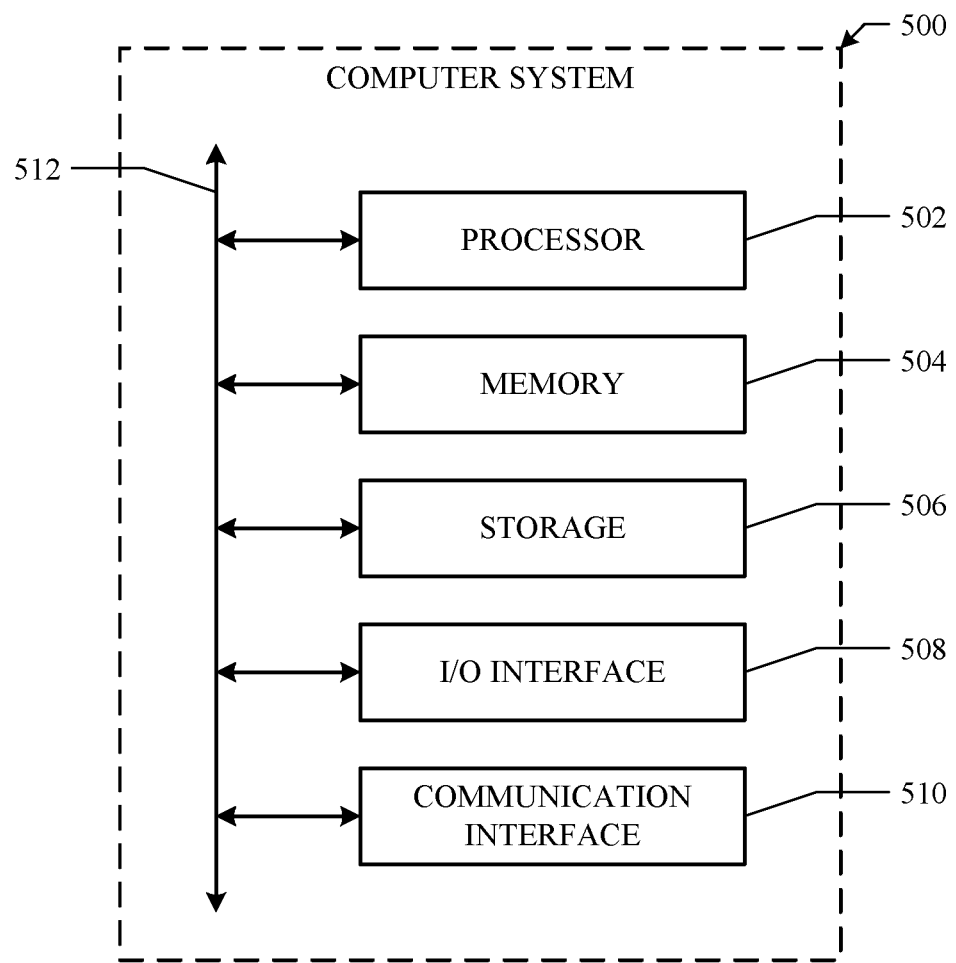
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   by a computing system, receiving an indication that a user is interested in a content of interest, wherein the content of interest comprises an opinion of an entity on a topic;
   by the computing system, identifying the entity and the topic associated with the content of interest;
   by the computing system, determining that the entity is associated with a predetermined group comprising the entity and one or more other entities, wherein each of the one or more other entities is associated with opinions on a plurality of predetermined topics associated with the group, wherein the plurality of predetermined topics include the topic associated with the content of interest, wherein the opinions are stored and accessible to the computing system;
   by the computing system, selecting one or more first entities from the group list of entities based on the entity associated with the content of interest, the one or more first entities being different from the entity associated with the content of interest;
   by the computing system, selecting one or more first contents respectively associated with the one or more first entities based on the topic associated with the content of interest, the one or more first contents each comprising the opinion of the associated first entity on the topic associated with the content of interest; and
   by the computing system, displaying at least a portion of the one or more first contents with at least a portion of the content of interest.

2. The method of claim 1, wherein the identifying of the topic is based on a classifier model trained to predict which of the plurality of predetermined topics relates to a content provided as input to the classifier model.

3. The method of claim 2, wherein the plurality of predetermined topics are determined using clustering analysis.

4. The method of claim 1, wherein the entity and the topic are identified based on metadata associated with the content of interest, and the metadata associated with the content of interest comprise tags selected by users of a social-networking system.

5. The method of claim 1,
   wherein the entity associated with the content of interest is a candidate for a political office;
   wherein the topic of the content of interest is a political issue category; and
   wherein the content of interest relates to an opinion of the candidate on the political issue category.

6. The method of claim 5,
   wherein the one or more first entities are other candidates for the political office; and
   wherein one of the first contents relates to a first opinion of one of the other candidates on the political issue category.

7. The method of claim 6, further comprising:
   determining that all candidates for the political office in an election consist of the candidate and the other candidates; and
   determining that opinions of all of the candidates on the political issue category are accessible.

8. The method of claim 1,
   wherein the computing system is associated with a social-networking system; and
   wherein one of the first contents associated with one of the first entities is retrieved from a profile page of the social-networking system, the profile page being associated with the first entity.

9. The method of claim 1,
   wherein the computing system is associated with a social-networking system;
   wherein one of the first contents associated with one of the first entities is retrieved from a third-party web page relative to the social-networking system, the third-party web page being associated with the first entity.

10. The method of claim 1,
    wherein portions of the first contents are displayed in an order that is randomly determined.

11. The method of claim 1,
    wherein the entity associated with the content of interest is of a type selected from one of a person, a publisher, or an organization; and
    wherein each of the first entities is of the type.

12. The method of claim 1, wherein the selecting of the one or more first contents is based on clustering analysis.

13. The method of claim 1, wherein the selecting of the one or more first contents comprises using a distance measure to determine that the one or more first contents cover a spectrum of opinions on the topic.

14. The method of claim 1, further comprising:
by the computing system, determining that the content of interest has at least a threshold number of followers on a social-networking system expressing an interest in the content of interest.

15. The method of claim 1, further comprising:
by the computing system, determining that the topic of the content of interest is one of the plurality of predetermined topics; and
by the computing system, determining that the entity associated with the content of interest is one of a plurality of predetermined entities.

16. The method of claim 1, further comprising:
by the computing system, determining that a maximum limit within a predetermined time period for displaying the portion of the one or more first contents has not been reached.

17. A system comprising: one or more processors; and a memory coupled to the processors comprising instructions executable by the processors, the processors being operable when executing the instructions to:
receive an indication that a user is interested in a content of interest, wherein the content of interest comprises an opinion of an entity on a topic;
identify the entity and the topic associated with the content of interest;
determine that the entity is associated with a predetermined group comprising the entity and one or more other entities, wherein each of the one or more other entities is associated with opinions on a plurality of predetermined topics associated with the group, wherein the plurality of predetermined topics include the topic associated with the content of interest, wherein the opinions are stored and accessible to the system;
select one or more first entities from the group based on the entity associated with the content of interest, the one or more first entities being different from the entity associated with the content of interest;
select one or more first contents respectively associated with the one or more first entities based on the topic associated with the content of interest, the one or more first contents each comprising the opinion of the associated first entity on the topic associated with the content of interest; and
display at least a portion of the one or more first contents with at least a portion of the content of interest.

18. The system of claim 17, wherein the identifying of the topic is based on a classifier model trained to predict which of the plurality of predetermined topics relates to a content provided as input to the classifier model.

19. One or more computer-readable non-transitory storage media embodying software that is operable when executed to:
receive an indication that a user is interested in a content of interest, wherein the content of interest comprises an opinion of an entity on a topic;
identify the entity and the topic associated with the content of interest;
determine that the entity is associated with a predetermined group comprising the entity and one or more other entities, wherein each of the one or more other entities is associated with opinions on a plurality of predetermined topics associated with the group, wherein the plurality of predetermined topics include the topic associated with the content of interest, wherein the opinions are stored and accessible to a computing system;
select one or more first entities from the group based on the entity associated with the content of interest, the one or more first entities being different from the entity associated with the content of interest;
select one or more first contents respectively associated with the one or more first entities based on the topic associated with the content of interest, the one or more first contents each comprising the opinion of the associated first entity on the topic associated with the content of interest; and
display at least a portion of the one or more first contents with at least a portion of the content of interest.

20. The computer-readable non-transitory storage media of claim 19, wherein the identifying of the topic is based on a classifier model trained to predict which of the plurality of predetermined topics relates to a content provided as input to the classifier model.

* * * * *